J. S. THOMPSON.
TYPE CASTING AND DISTRIBUTING MACHINE.
APPLICATION FILED JULY 28, 1904.

903,917.

Patented Nov. 17, 1908.

7 SHEETS—SHEET 1.

WITNESSES:

INVENTOR
John S. Thompson
BY
John W. Hill
ATTORNEY

J. S. THOMPSON.
TYPE CASTING AND DISTRIBUTING MACHINE.
APPLICATION FILED JULY 28, 1904.
903,917.
Patented Nov. 17, 1908.
7 SHEETS—SHEET 2.
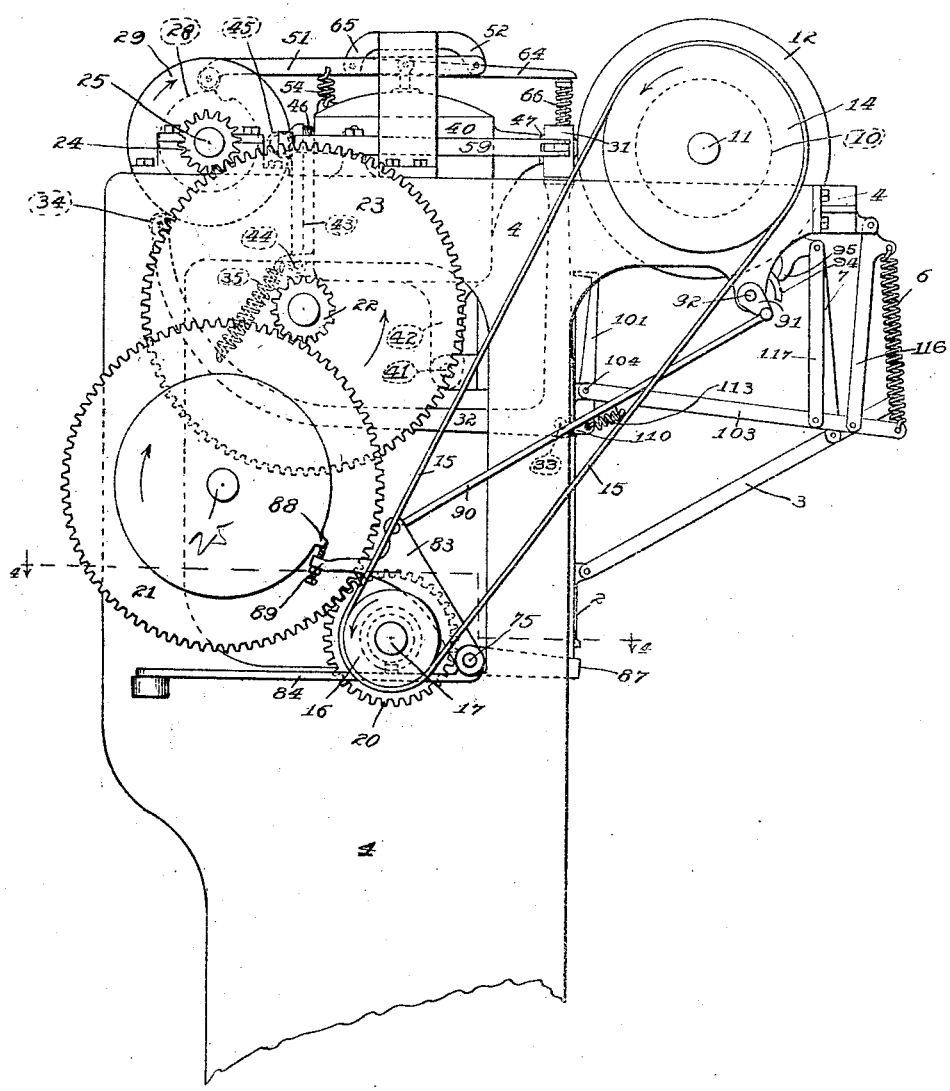

J. S. THOMPSON.
TYPE CASTING AND DISTRIBUTING MACHINE.
APPLICATION FILED JULY 28, 1904.
903,917.
Patented Nov. 17, 1908.
7 SHEETS—SHEET 3.
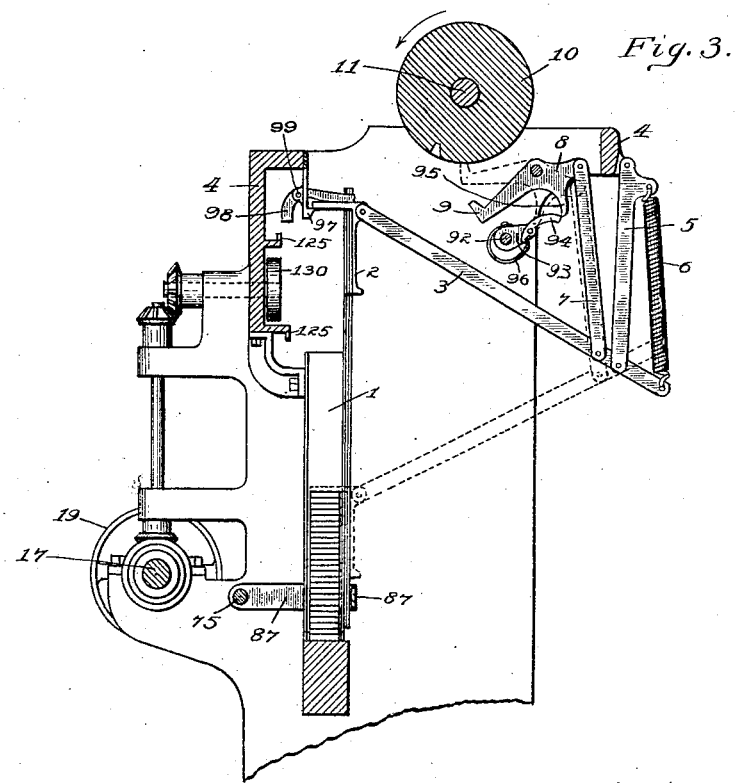
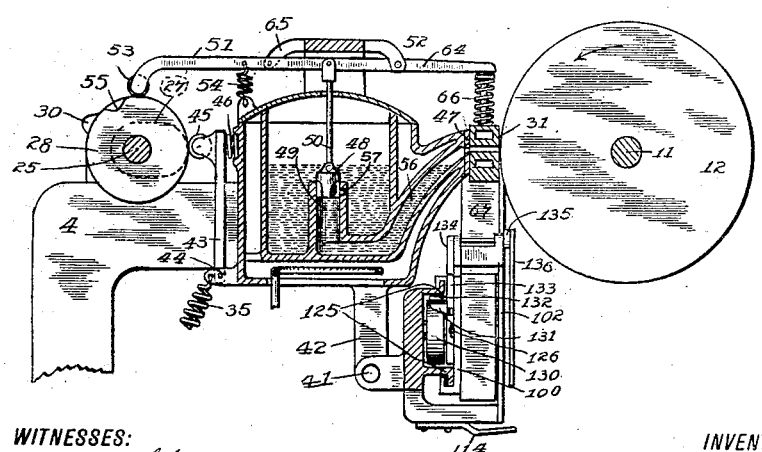
WITNESSES:
John Braunwalder
Burton A. Hills
INVENTOR
John S. Thompson
BY
John H. Hill
ATTORNEY J. S. THOMPSON.
TYPE CASTING AND DISTRIBUTING MACHINE.
APPLICATION FILED JULY 28, 1904.

903,917.

Patented Nov. 17, 1908.

7 SHEETS—SHEET 4.

WITNESSES:

INVENTOR

BY

ATTORNEY

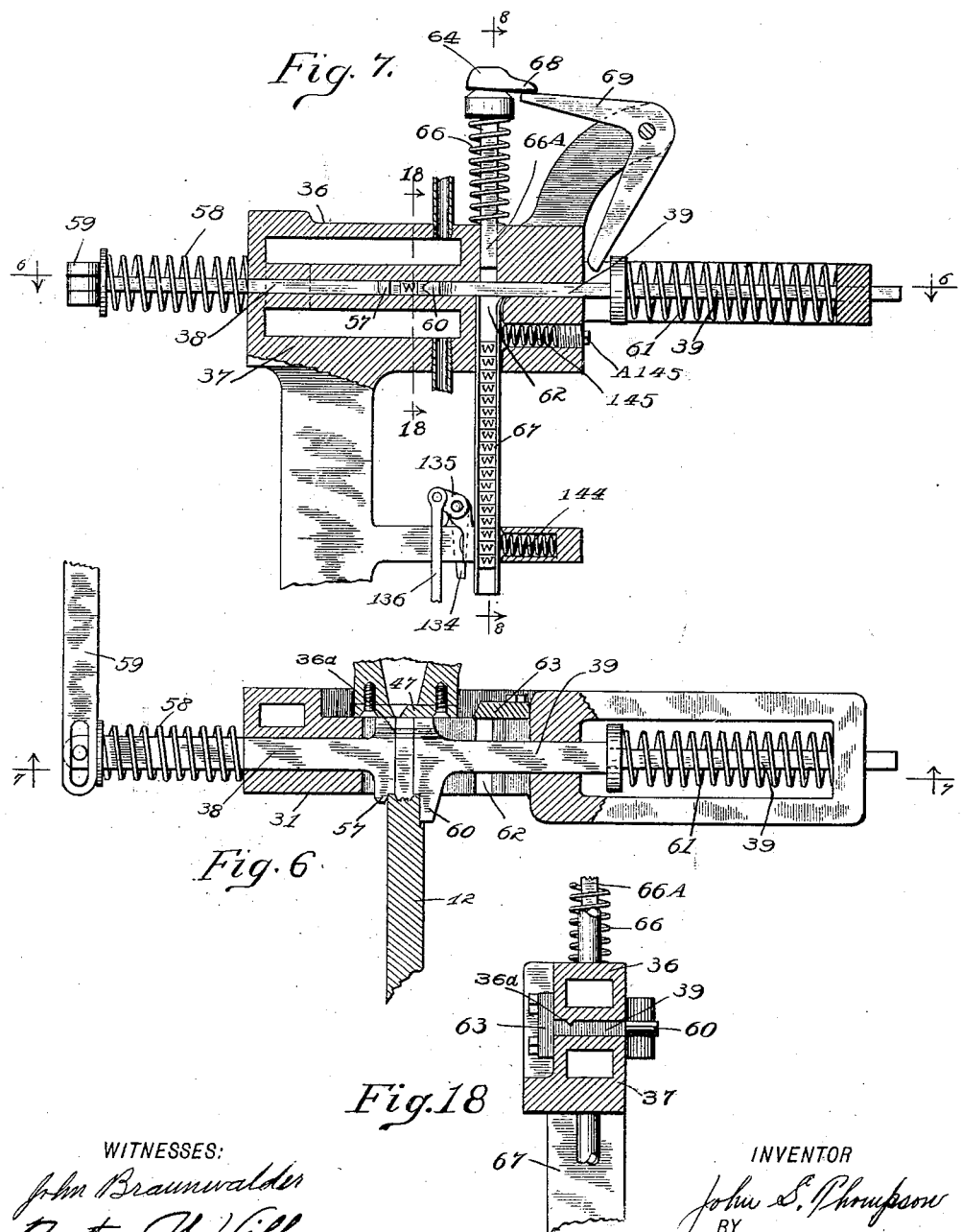

J. S. THOMPSON.
TYPE CASTING AND DISTRIBUTING MACHINE.
APPLICATION FILED JULY 28, 1904.
903,917.
Patented Nov. 17, 1908.
7 SHEETS—SHEET 6.
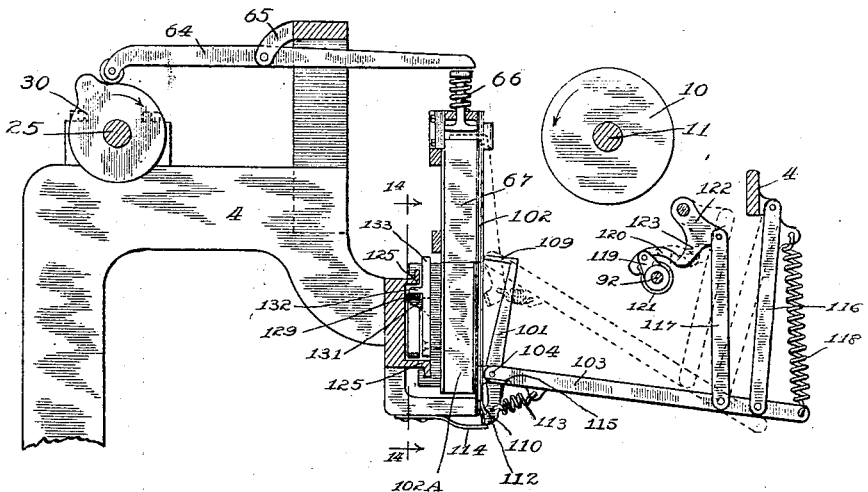
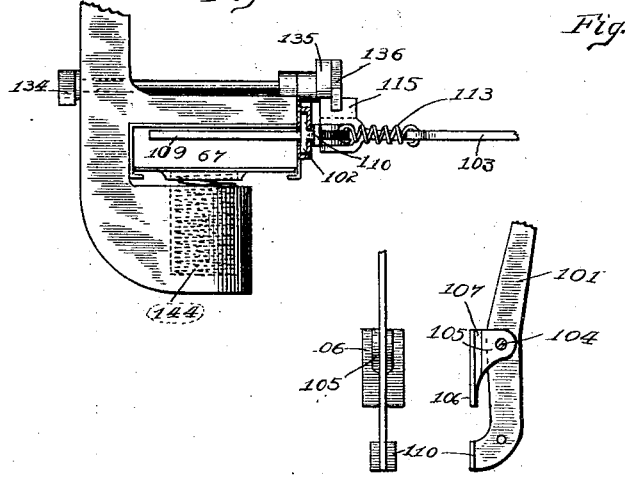
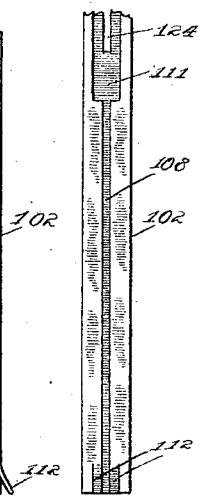
WITNESSES:
INVENTOR
John S. Thompson
BY
John W. Hill
ATTORNEY

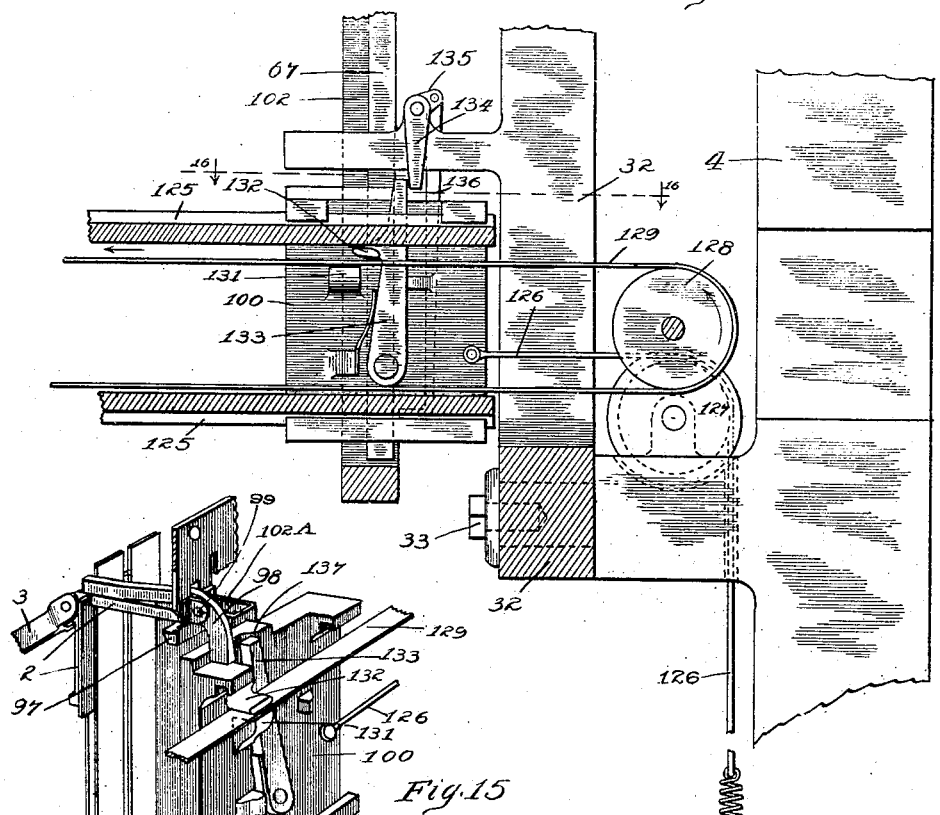
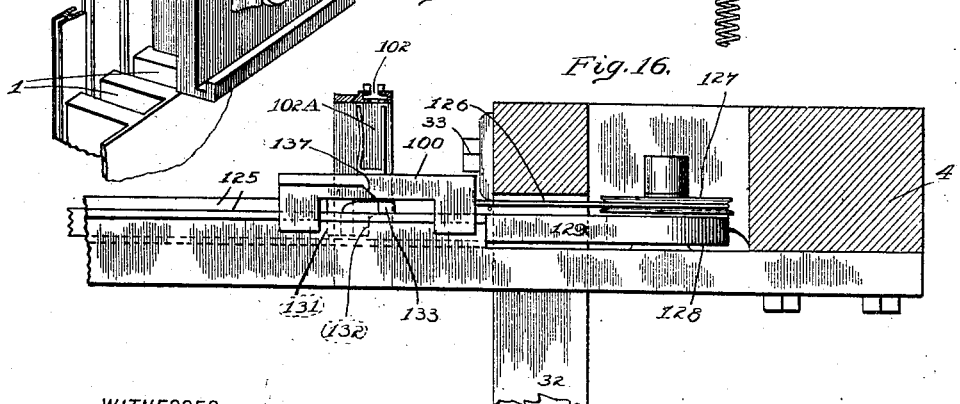

UNITED STATES PATENT OFFICE.

JOHN S. THOMPSON, OF CHICAGO, ILLINOIS.

TYPE CASTING AND DISTRIBUTING MACHINE.

No. 903,917.      Specification of Letters Patent.      Patented Nov. 17, 1908.

Application filed July 28, 1904. Serial No. 218,451.

*To all whom it may concern:*

Be it known that I, JOHN S. THOMPSON, a citizen of the United States of America, residing at Chicago, in the county of Cook and State of Illinois, have invented certain new and useful Improvements in Type Casting and Distributing Machines, of which the following is a description.

My invention relates to the production of type to be used in the art of printing, and storing the same in magazines or channels from which they may be withdrawn as desired for use.

The object of my invention is to produce a device of the kind described which will automatically produce the type as required, transfer the same to, and deposit them in their respective channels or receptacles from which they may be withdrawn by any suitable means and automatically replenish the supply in any channel from which the type may have been exhausted beyond a certain limit.

To this end my invention consists in the novel construction, arrangement and combination of parts herein shown and described and more particularly pointed out in the claims.

Figure 1:
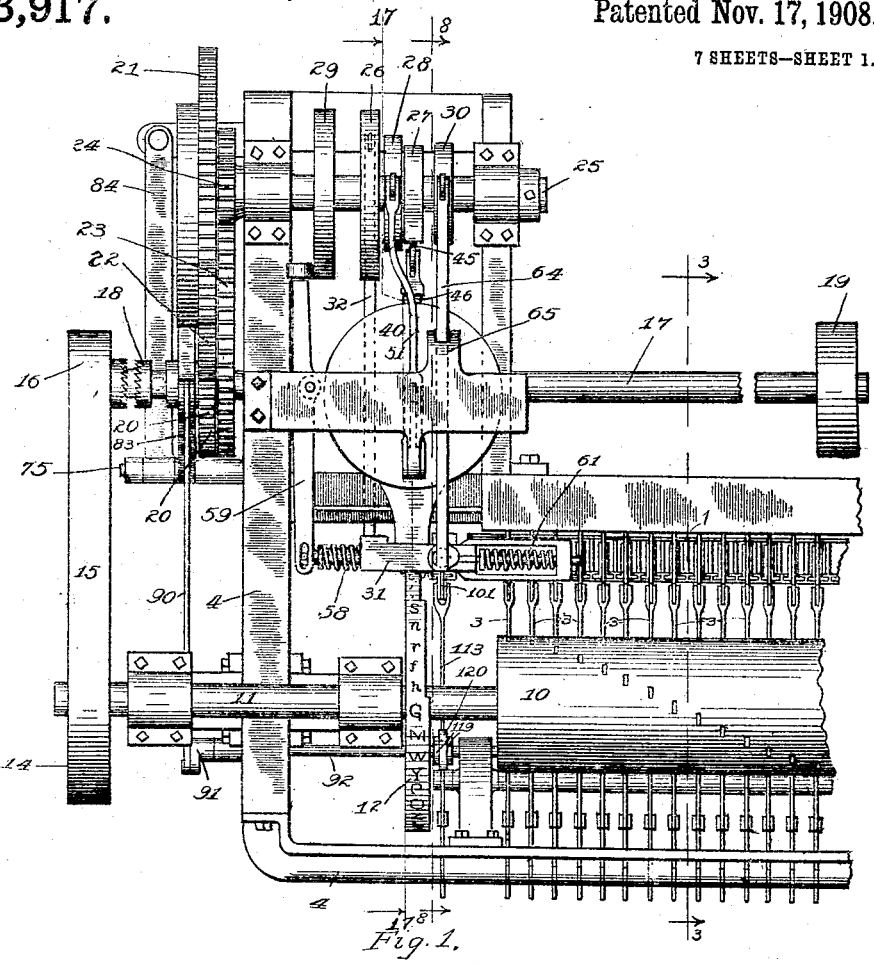
Figure 4:
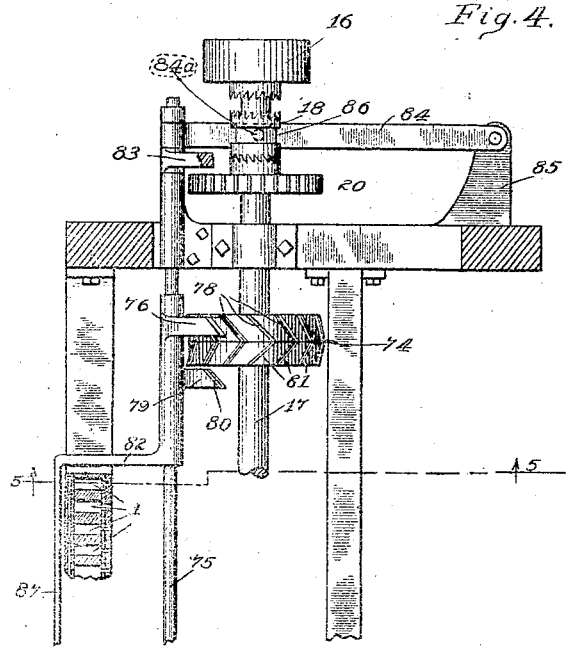
Figure 5:
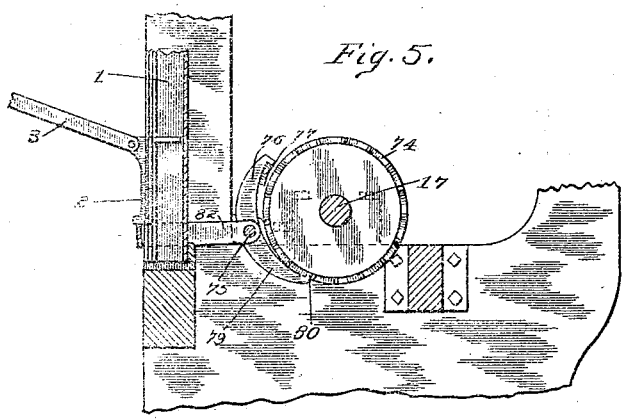

In the accompanying drawings wherein like or similar reference characters indicate like or corresponding parts; Figure 1 is a partial plan view of my invention; Fig. 2 is an end elevation of the same; Fig. 3 is a section on line 3—3 of Fig. 1; Fig. 4 is a section taken substantially on line 4—4 of Fig. 2 with intervening parts removed or broken away, to clearly show the arrangement of parts on shaft 17 and the coöperating mechanism for operating the clutch on said shaft; Fig. 5 is a section taken substantially on line 5—5 of Fig. 4, with the addition of a follower in position in the channel; Fig. 6 is a section at the mold taken substantially on line 6—6 of Fig. 7; Fig. 7 is a section taken substantially on line 7—7 of Fig. 6 showing the mold and coöperating parts; Fig. 8 is a partial section taken substantially on line 8—8 of Fig. 1; Fig. 9 is a view looking upward at the temporary receiving channel and adjacent parts; Figs. 10, 11, 12 and 13 are details; Fig. 14 is a partial section taken substantially on line 14—14 of Fig. 8, showing the means for moving the type transferring carriage with the mechanism for engaging it with the moving belt; Fig. 15 is a fragmentary perspective view showing the mechanism for stopping the type transferring carriage with its load of type at the channel into which the type are to be delivered; Fig. 16 is a section taken substantially on line 16—16 of Fig. 14; Fig. 17 is a section taken substantially on line 17—17 of Fig. 1; and Fig. 18 is a section taken substantially on line 18—18 of Fig. 7.

In the preferred form of my device 1—1 are channels for receiving and storing the type produced by my machine, and from which the type may be withdrawn through an opening at the bottom of each channel as required.

2 is a follower with which each channel is provided and which is adapted to rest upon the type contained in the channel.

3 is an arm pivotally attached to the followers also attached to the frame 4 by means of a link 5, or equivalent means the arm being arranged to extend beyond the link and having a spring 6 attached to its extremity arranged to increase the pressure of the follower upon the type.

7 is a second link connecting the arm 3 to a pivotally supported dog 8 having a part 9 adapted to enter one of a series of depressions or pockets in the periphery of a selecting cylinder 10. The cylinder 10 is mounted upon a shaft 11 supported in suitable bearing upon the frame 4, a matrix wheel 12 substantially the same as that described in my application for a type casting machine, filed May 18th, 1904, Serial No. 208,509 and a pulley 14 being also mounted thereon. The cylinder 10 is provided with a pocket or depression for each matrix upon the matrix wheel 12 and the wheel 12 and cylinder 10 are so mounted upon the shaft 11 that when the part 9 of a dog 8 is engaged with a pocket or depression in the cylinder the corresponding matrix upon the matrix wheel is positioned to coöperate with the type casting mechanism of my device. The pulley 14 is preferably attached to the shaft by a suitable friction device permitting a slight slippage to occur if necessary without damaging the machine.

A belt 15 or equivalent means is provided to transmit motion to the pulley 14 from a pulley 16 rotatably mounted upon a shaft 17. One end of the hub of the pulley is provided with projections or jaws adapted to coöperate, when desired, with similar jaws upon one end of a longitudinally slidable clutch 18 mounted upon the shaft 17 and prevented from rotating thereon by a suitable feather or equivalent means enabling the shaft 17 to drive the pulley 16 when required. The opposite end of the clutch 18 is provided with similar jaws to coöperate with jaws upon the hub of a pinion 20 rotatably mounted on the shaft 17, to enable the shaft to drive the pinion when required, the distance between the adjacent hub ends being such with reference to the length of the clutch that it can not engage both the pulley and the pinion at the same time. The shaft 17 is preferably the main driving shaft of my machine and is continuously rotated by any suitable means in the direction indicated when the machine is in operation. For example, a belt from some convenient source of power may be extended to the pulley 19 for this purpose. The gears 21 and 23 and pinions 22 and 24 are arranged to transmit power from the pinion 20 upon the shaft 17 to the shaft 25 supported in suitable bearing upon the frame 4.

26, 27, 28, 29 and 30 are cams fixedly mounted upon the shaft 25, each adapted to control some part of the mechanism of my machine (Fig. 1.) The cam 26 controls the movements of the mold 31 which is supported at one extremity of the bell crank lever 32 (Fig. 2) pivoted to the frame 4 at 33, and is provided with a roller 34 arranged upon its other extremity to bear against the face of the cam 26 during one period of the operation. The mold is normally held in contact with a matrix upon the wheel 12 by a spring 35 secured to the bell crank 32 and some suitable part of the device for that purpose, and is retracted from the matrix by the operation of the cam 26 to enable the cast type to be trimmed and ejected.

The mold (see Figs. 6 and 7) is preferably water jacketed and comprises a top or cap portion 36 adjustably connected to a base or bottom portion 37 which form the top and bottom respectively of the mold cell, the height of the cell and hence the thickness of the type corresponding to the thickness of the movable liners 38 and 39 the adjacent ends of which form the sides of the cell, the width or set of the type being governed by the distance between the ends of the liners.

The cam 27 controls the movement of the melting pot 40 which may be of the usual or any preferred form provided with suitable means for heating the material therein contained. The pot is pivotally connected to the frame 4 at 41 by the arm 42, the pivot 41 being preferably so positioned that the weight of the pot and its contents augmented by the tension of a spring 35, suitably secured for the purpose, will be partially supported by the lever 43, pivotally attached to the pot at 44 and having a roller 45 near its upper or free extremity arranged to bear upon the face of the cam 27. A spring 46 is positioned between the free end of the lever 43 and the pot to act as a cushion when the nipple or nozzle 47 of the pot is forced against the mold 31 by the cam 27 preparatory to filling the mold cell from the contents of the pot.

The cam 28 controls the periodical discharge of the material from the pot 40 into the mold cell to form a type. A plunger 48 is fitted to the cylinder 49, upon the interior of the melting pot, and is connected by the rod 50 to the lever 51 having one end pivotally connected to the bracket 52 upon the frame 4 (Figs. 1 and 17). The opposite end of the lever is provided with a suitable anti-friction roller 53, to bear upon the face of the cam 28, a suitable spring 54 or equivalent means being provided to exert sufficient force upon the lever 51 to cause the roller to closely follow the cam outline and operate the plunger. When the cam rotates to a position where the roller 53 can enter the depression 55 in the cam face, the spring 54 draws the lever 51 downward forcing the plunger 48 farther into the cylinder 49 causing some of the molten metal therein to flow through the channel 56 and nipple 47 into the mold cell to form a type. Upon the lever being returned to its former position by the cam the plunger is again withdrawn uncovering the opening 57 permitting some of the metal in the pot to flow into the cylinder to take the place of that left in the mold to form the type.

The cam 29 controls the movements of the liner 38 and indirectly the liner 39 also (Figs. 1, 7 and 8). During the time that the mold is in position at the matrix to cast a type the liner 38 is held with the short projection 57 in contact with the side of the matrix wheel 12 against the pressure of the spring 58 by the lever 59 operated by the cam 29. During this period the projection 60 upon the liner 39 is held in contact with the opposite side of the matrix wheel 12 by the spring 61 (Fig. 6). The projection 60 being sufficiently long to engage the side of the matrix wheel when the mold is retracted to its position farthest from the same. After each type is cast the mold is retracted separating the matrix wheel therefrom and the cam 29 operates the lever 59 to move the liner 38 and the type just cast toward an opening 62 in the base of the mold, the liner 39 being thereby forced out of its normal position and compressing the spring 61 until the type is positioned directly over the opening 62, the face of the liner 38 being directly above and in line with the adjacent edge of the opening; when the parts reach this position the type is removed from between the liners. The faces of the two liners are in contact while they are returning to the casting position until the projection 60 engages the side of the matrix wheel and stops the liner 39, the liner 38 continuing its movement until the projection 57 is in position to engage the opposite side of the wheel, when the mold is again moved forward into contact with the wheel. The face of the projection 57 being slightly beveled back at the outer end to prevent contacting with and engaging the face of the wheel. While moving to the ejecting position the type is carried past a knife 63 rigidly mounted at the rear of the base and cap in position to finish the foot of each type as it passes and bring the type to exactly the correct length. Preferably a ridge or projection 36ª is formed longitudinally upon the face of the cap 36 or base 37 of the mold and a corresponding groove formed in the liners to coöperate therewith to prevent lateral displacement of the same, and as the ridge extends across the mold cell, when a type is cast therein a nick or notch is formed in the body of the type which coöperates with the ridge to prevent longitudinal movement of the type when separated from the matrix and melting pot nipple and also while passing the trimming knife to the ejector. Obviously a plurality of such ridges may be employed to produce a number of such nicks, or, such ridges may be formed upon other faces of the mold to form nicks upon more than one side of the type if desired.

The cam 30 controls the discharge of the type from between the liners into the temporary receiving channel (Fig. 8). When the type arrives at the proper position above the opening 62 a lever 64 pivotally attached to the bracket 65 upon the frame 4 is operated by the cam 30 and moves the ejector bar downward against the pressure of the spring 66 forcing the type out from between the liners into the temporary receiving channel 67. Preferably a projection 68 is formed upon the lever 64 in position to engage one arm of a pivotally mounted bell crank lever 69 and rock the same as the lever descends, the other arm of the lever 69 being suitably formed and positioned to engage a collar or other suitable means upon the liner 39 and move the liner away from the type sufficiently to reduce the pressure by which the type is held between the liners and thus produce a more satisfactory discharge.

Preferably at each rotation of the shaft 25 a complete cycle of operations of the type producing mechanism is performed, consisting of 1st, presenting the mold to a matrix upon the wheel 12, 2nd, closing the back of the mold with the nipple of the melting pot, 3rd, forcing a portion of the contents of the melting pot into the mold cell, 4th, retracting the nipple of the melting pot from the mold, 5th, withdrawing the mold from the matrix, 6th, moving the cast type to a position convenient for ejecting the type from between the liners, trimming the end of the type as it moves to such a position, 7th, relieving the pressure of the liners upon the type and ejecting the same from the grip of the liners into the temporary receiving channel, and 8th, returning the liners to their first position ready to recommence the cycle of operations to produce another type. If now the matrix wheel 12 be prevented from rotating while the shaft 25 is caused to make any number, for example 20, rotations then an equal number of practically identical type will be automatically cast and placed in the temporary receiving channel 67.

To engage the clutch 18 with the pinion 20 to rotate the shaft 25 and also to disengage the same after the shaft 25 has made the desired number of rotations, I fix a double cam 74 upon the shaft 17 and a shaft 75 parallel to the shaft 17, and mounted in bearings upon the frame 4 whereby it may be partially rotated or moved longitudinally as desired (Figs. 4 and 5). A suitable dog 76 having a part 77 adapted to engage in any of the grooves 78 in one face of the cam 74 and a similar dog 79 having a part 80 to engage in any of the grooves 81 in the other face of the cam are fixed upon the shaft 75, as are also arms 82 and 83. One end of the lever 84 is loosely connected to the shaft 75, the opposite end being pivotally attached to the bracket 85 and having a pin or stud 84ª engaging the groove 86 of the clutch 18 to transmit the longitudinal movements of the shaft 75 to the clutch to engage and disengage the same with the pulley 16 and pinion 20. Preferably two or more arms 82 or equivalent means are arranged upon the shaft 75 and connected to the part 87 to give sufficient rigidity thereto, the part 87 being preferably positioned near the bottom and in front of the type channels 1, so that as the type are extracted from any of the channels 1 the downwardly projecting portion of the follower 2 in that channel will approach the part 87 until the part 9 of the dog 8 rests upon the surface of the selecting roller 10 (Fig. 3) and prevents the follower from descending farther until a partial rotation of the roller 10 brings one of the pockets upon the same into position for the part 9 to enter and permitting the downwardly extending portion of the follower 2 to move the part 87 downward partially rotating the shaft 75 and engaging the part 80 of the dog 79 in one of the grooves 81 in the cam face, this at once moves the shaft 75 to the position shown in Fig. 4 engaging the clutch 18 with the pinion 20 and rotating the shaft 25. To disengage the clutch 18 when the shaft 25 has made the desired number of rotations a stop 88 is arranged upon a gear connected to the shaft 25 (Fig. 2). In the preferred form one of the train of gears which drive the shaft 25 is provided with the stop 88 for example, the gear 21 shown in Fig. 2, the proportions of the gears are arranged so that the gear 21 carrying the stop makes one rotation while the shaft 25 makes about twenty although it is evident that the proportions may be varied as desired.

With the shaft 75 in the position shown in Fig. 4 a part 89 of the arm 83 is directly in the path of the stop upon the gear 21 (Fig. 2) so that as the gear rotates, at a certain point the stop 88 engages the arm 83 and partially rotates the shaft 75 causing the part 77 of the dog 76 to engage with one of the grooves 78 of the cam 74 moving the shaft 75 longitudinally and disengaging the clutch 18 from the pinion 20 and engaging it with the pulley 16, at the same time moving the part 89 of the arm 83 out of the path of the stop 88 so that the shaft 75 may be rotated in the opposite direction by the arm 82 when it is again necessary to replenish the supply of type in one of the channels 1.

Before the shaft 11 can be rotated by the belt upon the pulley 16 (Fig. 2) it is necessary that the part 9 of the dog 8 (Fig. 3) be withdrawn from the pocket it entered in the selecting roller 10 to enable the mechanism to engage the clutch 18 with the pinion 20 (Fig. 4). This is accomplished by a rod 90 (Fig. 2) connecting the arm 83 with a crank 91 upon the shaft 92 rotatably supported in suitable bearings in the frame 4. Opposite each of the dogs 8 there is a crank 93 fixed upon the shaft 92 (Fig. 3) each crank having a catch or trigger 94 pivotally attached thereto near its extremity, adapted to engage a projection 95 formed upon the dog 8. A spring 96 maintains the catch 94 in such a position that when the part 9 of a dog 8 is engaged in a pocket on the roller 10 the part 95 of the dog is in a position to be engaged by the catch 94 opposite thereto. When the stop 88 (Fig. 2) engages the arm 83 the rod 90 partially rotates the shaft 92 and the catch 94 engages the part 95 of the dog 8 partially rotating the same upon its support withdrawing the part 9 from the pocket leaving the roller 10 free to rotate. The movement of the dog 8 is transmitted by the link 7 (Figs. 2 and 3) and the arm 3 to the follower 2 which is moved upward to the top of its guide arranged before the channel 1 where one end of that portion of the follower normally resting upon the type in the channel engages a spring catch 97 which retains the parts in this position until released. As the follower moves to the position just described it engages an arm of the carriage stop 98 pivotally connected to the spring catch 97 at 99 (Figs. 3, 15 and 16) and swings the stop 98 into the path of parts upon the horizontally moving carriage 100 whereby the movement of the carriage is stopped and the follower 2 released from the catch 97, as is more particularly pointed out hereafter.

The partial rotation of the shaft 92 (Figs. 2, 3 and 8) also operates the mechanism for moving the type from the receiving channel 67 into the transfer channel upon the carriage. This is accomplished by a finger 101 vertically guided by the channel 102, positioned before the receiving channel 67, and moved by the arm 103 (Figs. 8 to 16). The finger 101 is pivotally attached at 104 to the vertically movable slide 105 and the arm 103, the slide being forked to engage the pin 104 upon both sides of the finger and the arm 103 being forked to engage the pin 104 upon both sides of the slide which is provided with a suitable portion 106 adapted to fit within the channel 102 and a neck 107 to extend through the slot 108 in the face of the channel. The finger 101 is provided with a hook 109 at its upper end and a guide 110 at its lower end, the bearing surface of the guide 110 preferably being made narrower than that of the slide 105 and adapted to engage with either the interior or exterior face of the channel 102, that portion of the finger 101 adjacent to the guide 110 being narrow enough to pass through the slot 108 when the guide 110 is inside the channel, and the slot 108 being sufficiently widened at 111 to allow the slide 110 to pass through while retaining a sufficient bearing upon either side for the slide 105. A portion 112 at the lower end of the channel 102, of sufficient width to permit the entrance of the guide 110, is cut out and bent forward forming a spring catch for the guide 110, so that when the guide is raised after passing the part 112 it will be engaged and directed into the channel. A spring 113 (Fig. 8) is attached to the lower part of the finger 101 and to the arm 103 to draw the guide through the opening at 111 as soon as this point is reached, and a spring or stop 114 is provided to stop or limit the downward motion of the finger at the proper point. The arm 103 (Figs. 8 and 9), except the part 115 provided to engage the mechanism for starting the type carriage as hereinafter pointed out is similar in form and operation to the arm 3, (Fig. 3) also the links 116 and 117, and the spring 118, as well as the crank 119, the catch 120 and the spring 121, correspond both in construction and operation to the links 5 and 7 the spring 6 the crank 93 the catch 94 and the spring 96. The part 122 corresponds with the dog 8 the arm on which the part 9 is formed being removed.

The operation is as follows, when the shaft 92 is partially rotated the catch 120 engages the projection 123 upon the part 122 and partly rotates the same which by its connection to the arm 103 raises the finger 101 toward the top of the channel, the hook 109 is held out of the type channel until the guide 110 reaches the part 111 of the slot 108 when the spring 113 draws the guide to the outside of the guide channel 102. This movement thrusts the hook 109 through the slot 124 of the guide channel into the type channel 67 above the uppermost type in the channel as shown in dotted lines in Fig. 8. The parts are so timed that at this movement the catch 120 slips from engagement with the projection 123 allowing the spring 118 to move the finger 101 carrying, by means of the hook 109, all the type in the type receiving channel downward into the carriage channel. As the finger reaches the bottom of its stroke the part 115 upon the arm 103 engages the carriage starting mechanism, at the same time the guide 110 in passing the spring 112 encounters the spring 114 which the momentum of the parts depresses allowing the guide to pass the spring 112 when as the momentum is overcome the parts are slightly raised again causing the guide 110 to again move forward and enter the guide channel thereby withdrawing the hook 109 from the type channel leaving the carriage free to move out to the storage channels and the parts in position to again perform their cycle of operations.

The carriage 100 (Figs. 14 to 17) is arranged to laterally slide upon suitable ways 125 to transfer the type from the temporary receiving channel 67 to the channel allotted to receive that particular form of type. To this end the carriage is provided with a spring actuated receiving channel 102ª which, as the carriage is moved along the ways, may be brought to exactly register with the lower end of the receiving channel 67, as shown in Fig. 8, or with the top end of any of the channels 1, the adjacent ends of the two channels when in position so nearly meeting that the type may be swept downward from one channel to another without becoming disarranged at their junction. Normally the carriage channel and the receiving channel 67 are in registry, the carriage being held against a suitable stop (not shown) by means of the cord 126 or equivalent means attached to the carriage and passing over the sheave 127 to a suitable weight or spring, as shown in Fig. 14. Any convenient means may be employed to normally return the carriage to a position where these channels will register, the means shown being preferred.

It is obvious that if preferred the receiving channel 67 may be omitted and the type ejected from between the liners 38 and 39 into the spring actuated channel upon the carriage which may be arranged to occupy the position now occupied by the receiving channel 67 and in this case the mechanism for engaging the type in the channel 67 and moving it into the carriage channel may also be omitted.

To move the carriage along the ways against the action of the spring or weight upon the cord 126 I arrange a belt upon two pulleys one being situated at either end of the ways 125. The pulley 128 is preferably merely an idler about which the belt 129 travels, and is preferably arranged to be adjusted to take up any slack in the belt arising from stretching or other cause. The pulley 130 at the opposite end of the ways is driven in any desired manner preferably from the shaft 17 as shown in Fig. 3.

To transmit the motion of the belt 129 to the carriage 100 a pair of grippers are provided, the stationary gripper 131 being rigidly attached to the carriage substantially in contact with the belt, while the movable gripper 132 is so arranged that when moved in the direction in which the belt 129 is traveling the gripping faces approach each other and engage the belt between them. The movable gripper is preferably arranged upon a lever 133 as shown, the free end of which extends beyond the belt to give the starting and stopping mechanism convenient access thereto.

The starting device comprises a bell crank lever the arm 134 of which is arranged to engage the lever 133 when a downward pressure is applied to the other arm 135 (Figs. 9 and 14). Preferably a hooked rod 136 is pivotally attached to the arm 135 and so positioned that when the type have been transferred from the receiving channel 67 to the carriage channel the lug or equivalent part 115 will engage the hook upon the rod 136 operating the bell crank lever and starting the carriage which will be moved along the ways by the engagement with the belt 129 until the particular channel is reached where the lack of type caused the type in the carriage to be cast. At this particular channel the corresponding follower 2 (Figs. 3 and 15) is hooked up and the carriage stop 98 is in operative position. As the carriage moves forward the stop hooks over the forward edge of the carriage and when the carriage channel registers with the storage channel the stop engages the lever 133 to disengage the carriage from the belt 129. At the same moment the cam face 137 of the carriage engages the stop 98 drawing the latch 97 out of engagement with the follower which is forced downward through the carriage channel into the storage channel carrying the type brought by the carriage with it, when the various parts automatically assume their normal positions.

In the foregoing description the preferred form of my device has been described and it is obvious that many modifications may be introduced without in any way departing from the spirit of my invention, hence I do not wish to be understood as limiting myself to the exact form and construction shown.

Having thus described my invention what I claim as new, and desire to secure by Letters Patent is;

1. In a device of the kind described, an adjustable mold for casting type from a plurality of matrices, a plurality of receptacles, one for each character of type, means for automatically transferring the type to and depositing the same in their respective receptacles, and intermediate mechanism connected with and controlled by the quantity of type in each receptacle, adapted to regulate the operation of the several parts of the machine whereby depleting a receptacle to a certain limit will automatically start the casting and transferring mechanism, replenishing the receptacle with the particular type for which it is provided.

2. A device of the kind described, comprising mechanism for casting the various forms of type provided with a plurality of movable matrices and means for moving the same, an adjustable mold adapted to coöperate with any of said matrices to produce a type a plurality of receptacles each adapted to hold a plurality of type cast from a single matrix, and means for automatically transferring the cast type to and depositing the same in said receptacles, in combination with automatic controlling mechanism connected with the receptacle, whereby the exhausting of the quantity of type in any receptacle below a certain number will automatically start said mechanism, and automatically cast, transfer to and deposit in said receptacle, a supply of the particular type for which said receptacle was provided.

3. A device of the kind described, comprising mechanism for casting the various forms of type, provided with a plurality of movable matrices and means for moving the same, a selecting cylinder having engaging means upon its surface adapted to control the movement of the matrices, an adjustable mold adapted to coöperate with any of said matrices to produce type, a plurality of receptacles each adapted to hold a plurality of type cast from a single matrix, and means for automatically transferring the cast type to and depositing the same in their respective receptacles, in combination with intermediate mechanism for each receptacle, coöperating with the selecting cylinder, adapted to control the supply of type thereto, whereby when the amount of type in any receptacle is reduced below a certain number said device for that receptacle will automatically engage one of the engaging means upon said cylinder, thereby starting said mechanism, to automatically cast, transfer to and deposit in said receptacle a supply of the particular type for which said receptacle is adapted.

4. In a device of the kind described, type casting mechanism, a plurality of receptacles each adapted to hold a plurality of identically formed type, an opening near the lower extremity of each receptacle whereby the type therein may be extracted, a follower resting upon the type in each receptacle pressing the same downward, and means for automatically transferring the cast type to and depositing the same in said receptacle, in combination with intermediate mechanism connected to and coöperating with each follower and controlled by the position thereof, adapted to start said mechanism when the amount of type in any receptacle is reduced below a certain number, and to automatically cast, transfer to, and deposit in said receptacle a supply of the type for which said receptacle is provided.

5. A device of the kind described, comprising a plurality of movable matrices and a cylinder provided with engaging means upon its surface for controlling the movements of said matrices, an adjustable mold adapted to coöperate with any of the matrices to produce a type, a plurality of receptacles each adapted to hold a quantity of type cast from a single matrix, a follower at each receptacle adapted to rest upon the type therein, and means for automatically transferring the cast type to and depositing the same in said receptacles, in combination with a plurality of stops each connected to a follower, and arranged as the type in a receptacle is exhausted to engage one of the engaging means upon said cylinder, present the matrix for producing the type for that receptacle to the mold and start the casting mechanism, when the device will automatically cast, transfer to and deposit in said receptacle a fresh supply of type.

6. In a device of the kind described, type casting mechanism, a plurality of storage receptacles each adapted to hold a quantity of identically formed type and means provided with a temporary receiver and a transfer receptacle for automatically transferring the type to and depositing the same in said receptacles, in combination with intermediate means adapted to automatically start said mechanism when the amount of type in any receptacle is reduced below a certain number which mechanism will then first, successively cast a fixed number of type for said receptacle and place them in the temporary receiver, then remove all the type in said receiver to the transfer receptacle, then move the transfer receptacle to the proper storage receptacle and simultaneously discharge the type into said storage receptacle.

7. In a device of the kind described, type casting mechanism provided with a plurality of movable matrices and means for moving the same, an adjustable mold adapted to coöperate with any of said matrices to produce a type, a plurality of storage receptacles or channels adapted to hold a plurality of type cast from a single matrix, and means provided with a temporary receiver and a transfer receptacle for automatically transferring the cast type to and depositing the same in said storage receptacles, in combination with means adapted to automatically start said mechanism when the amount of type in any receptacle is less than a certain number of type, and to first successively cast a fixed number of type for said receptacle and place them in the temporary receiver, then remove all the type in said receiver to the transfer receptacle, move the transfer receptacle to the proper storage receptacle and simultaneously discharge the type therein into said storage channel.

8. In a device of the kind described, type casting mechanism provided with a plurality of movable matrices, means for operating the same, a selecting cylinder having engaging means upon its surface arranged to control the operation of the matrices, an adjustable mold adapted to coöperate with any of said matrices to produce type, a plurality of storage receptacles each adapted to hold a plurality of type cast from a single matrix, and means for automatically transferring the cast type to and depositing the same in said receptacle, in combination with means adapted to automatically start said mechanism when the amount of type in any receptacle is reduced below a certain number, which mechanism will first successively cast a fixed number of type for said receptacle and place them in a temporary receiver, then remove all of the type in said receiver simultaneously to a transfer receptacle, move the transfer receptacle to the proper storage receptacle and simultaneously discharge the type therefrom into the storage receptacle.

9. In a device of the kind described, type casting mechanism, a plurality of storage receptacles each adapted to hold a plurality of identically formed type, and an opening near the lower extremity of each receptacle whereby the type therein may be extracted, a follower resting upon the type in each receptacle pressing the same downward, and means for automatically transferring the cast type to, and depositing the same in said receptacle, in combination with means connected to each follower and controlled by the position thereof adapted to automatically start said mechanism when the amount of type in any receptacle is reduced below a certain number, which will first successively cast a fixed number of type for said receptacle and place them in a temporary receiver, then simultaneously remove all the type in said receiver to a transfer receptacle, move the transfer receptacle to the proper storage receptacle, and simultaneously discharge the type therein into said storage receptacle.

10. In a device of the kind described, a plurality of movable matrices and a cylinder provided with engaging means upon its surface arranged to control the movement of said matrices, an adjustable mold adapted to coöperate with any of the matrices to produce a type, a plurality of storage receptacles each adapted to hold a quantity of type cast from a single matrix, a follower for each receptacle adapted to rest upon the type therein, and means for automatically transferring the cast type to and depositing the same in said receptacles, in combination with a plurality of stops each connected to a follower and arranged, when a follower descends below a certain point in its receptacle, to engage one of the engaging means upon said cylinder and present the particular matrix for producing the type for that receptacle to the mold, simultaneously starting the type casting mechanism, whereupon the device will automatically first successively cast a fixed number of type for said receptacle and transfer the same to and simultaneously deposit the same in said storage receptacle.

11. In a device of the kind described, a plurality of movable matrices and an adjustable mold adapted to coöperate with any of said matrices to form a mold cell for producing a printer's type of the usual form, in combination with a plurality of storage receptacles each adapted to receive a plurality of type cast from a single matrix, and provided with a follower to rest upon the type therein, each follower being provided with controlling mechanism adapted to be operated by the downward movement of the follower in any receptacle past a certain point to cause the matrix for producing the type contained in said receptacle to be placed in position to coöperate with said mold for casting type.

12. In a device of the kind described, a plurality of matrices arranged upon the periphery of a wheel, means for rotating the same, a cylinder having pockets or depressions in its surface mounted concentrically with said wheel and arranged to rotate therewith, and an adjustable mold adapted to coöperate with any of said matrices to form a mold cell for producing a printer's type of the usual form, in combination with a plurality of receptacles each adapted to contain a plurality of type cast from a single matrix, and provided with a follower to rest upon the type therein, each follower being provided with engaging mechanism adapted to be operated by the downward movement of the follower past a certain point to cause said engaging mechanism to engage one of the pockets of said cylinder to stop the rotation of said matrix wheel with the matrix for producing the form of type contained in said receptacle in position to coöperate with said mold for casting type.

13. In a device of the kind described, the combination of means for simultaneously moving a plurality of identically formed type from a receiver to a transfer receptacle, engaging said transfer receptacle with means for moving the same, and placing a movable stop in the path of said receptacle, and means operated by the movement of said stop to automatically transfer the type in the receptacle to the storage receptacle for which the same were cast.

14. A device of the kind described, comprising type casting mechanism provided with a plurality of movable matrices, means for moving the same, an adjustable mold adapted to coöperate with any of said matrices to produce a type of the usual form, a plurality of storage receptacles each adapted to hold a plurality of type cast from a single matrix, and means for transferring the type to and depositing the same in said receptacles, in combination with means controlled by the quantity of type in a receptacle, adapted to automatically start the following cycle of operations to replenish the supply of type therein: first, selecting and placing in position to coöperate with the mold the matrix for producing the desired type; second, casting a fixed number of type successively and placing them in a receiver; third, simultaneously moving the type from the receiver to a transfer receptacle, moving the follower from the storage receptacle, attaching the transfer receptacle to a device for moving the same and placing a stop in the path of the transfer receptacle; and fourth, stopping the transfer receptacle at the proper point and sweeping its contents into the storage receptacle.

15. A device of the kind described, comprising type casting mechanism, a series of similar receptacles each adapted to contain a single longitudinal row of identically formed type, means for transferring all identically formed type to one of said receptacles, and a follower adapted to rest upon said type and press the same downward, in combination with means connected to said follower adapted by the movement of the follower to automatically control the supply of type to said receptacle, move the follower from its position in said receptacle while new type is being transferred thereto and engage said follower with said new type to move them into said storage receptacle when returning to its original position therein.

16. In a device of the kind described, the combination of coöperating type casting means comprising a single mold having longitudinally movable liners, means for laterally moving the same while grasping a type between them to a receiver, and means for ejecting said type from between said liners into said receiver, and means for transferring said type from said receiver to and depositing the same in a storage receptacle.

17. In a device of the kind described, a plurality of similar receptacles each adapted to contain a single vertical row of identically formed type disposed transversely of said receptacle, a follower adapted to rest upon said type and press the same downward, and an aperture near the bottom of each receptacle for extracting type therefrom, in combination with means for automatically removing said follower from its position upon the type in said receptacle while the supply of type therein is being augmented and then returning the same to its position upon the type therein.

18. In a device of the kind described, selecting mechanism comprising a plurality of movable matrices, means for moving the same, and a selecting cylinder provided with engaging means upon its surface arranged to control the movements of said matrices, in combination with a plurality of receptacles each adapted to contain a single row of type cast from one of said matrices, a follower arranged to rest upon said type, and connected to a selecting dog adapted to engage said cylinder to stop said matrices in a predetermined position when the follower arrives at a certain point in said receptacle.

19. In a device of the kind described, selecting mechanism comprising a plurality of matrices mounted upon the periphery of a wheel, a selecting cylinder having depressions or pockets formed in its surface mounted concentrically with said matrix wheel and rigidly connected therewith, and means for rotating said matrix wheel, in combination with a plurality of receptacles each adapted to contain a single row of type cast from one of said matrices, and a follower arranged to rest upon said type and connected to a selecting dog adapted to engage said selecting cylinder when the follower reaches a certain point in said receptacle to disconnect the rotating means and stop the rotation of said matrix wheel at a predetermined point in its rotation.

20. A device of the kind described, comprising type casting mechanism, wherein a plurality of identically formed type are successively cast, a temporary vertical receiver open at both top and bottom having a fixed side and a spring actuated movable side adapted to press against type placed between them to retain the same therein, and means for depositing the type therein, in combination with means for simultaneously removing the type from said receiver, and transferring the same to a receptacle arranged for storing that particular type.

21. A device of the kind described, comprising type casting mechanism, means for transferring all identically formed type to and depositing the same in one of a series of similar receptacles each adapted to contain a single vertical row of identically formed type disposed transversely of said receptacle, in combination with a follower adapted to rest upon said type and press the same downward, and means connected to said follower adapted to automatically move the same from its position in said receptacle while new type is being delivered thereto and then returning the same to its position upon the type within the receptacle.

22. A device of the kind described, comprising the combination of the following elements; type casting mechanism, selecting mechanism comprising a plurality of movable matrices, means for operating the same, a selecting cylinder adapted to control the operation of the matrices provided with engaging means upon its surface, a plurality of vertically extended storage receptacles each adapted to contain a column of type cast from one of the matrices, a follower for each column of type arranged to rest thereon, a selecting dog connected to each follower normally disengaged from the cylinder and arranged to engage one of the engaging means on the cylinder when the follower descends to a certain predetermined point, intermediate mechanism between the follower and the casting mechanism, a receiver for the cast type, and means for removing the type from the receiver, transferring them to and depositing them in the particular receptacle for their reception, whereby at the moment the follower reaches a predetermined point in its descent the matrix corresponding to the particular follower and receptacle is suitably positioned, the casting means is simultantously started, a predetermined number of type are successively cast from said matrix and deposited in the receiver and at the completion of the casting operation the follower is raised, stopping the casting, and the type in the receiver are transferred to and deposited in the proper receptacle with the follower resting thereon.

23. A device of the kind described, comprising the combination of means for automatically casting a plural series of type, a plurality of storage receptacles and intermediate conveying mechanism for transferring the cast type to their several storage receptacles.

24. In a device of the kind described, means for casting type, and a plurality of receptacles for said type, said casting means operating to successively cast a plurality of identical type at each operation, in combination with means for automatically controlling the operation of said casting means by the number of type extracted from said receptacles.

25. A device of the kind described, comprising the combination of mechanism for casting a plural series of characters used in printing, a magazine or receptacle, means for depositing the type in the magazine adapted to receive them, and means controlled by the number of such characters in said magazine for starting the casting mechanism and casting a predetermined number of such characters.

26. A device of the kind described, comprising the combination of means for casting a predetermined number of one of the characters used in the art of printing, a receptacle for said type, a part normally resting upon the type in said receptacle, means for transferring to and depositing the type in said receptacle, controlled by the part normally resting upon the type in said receptacle.

27. A device of the kind described, comprising the combination of means for casting in plural series the various characters used in printing, means for controlling the selection of the required matrix to form a mold for the desired character determined by the number of such characters still remaining in the magazine for that character.

28. In a device of the kind described, means for casting the various characters used in the art of printing, a separate receptacle for each character, intermediate means for transferring each character of type to the particular receptacle arranged to receive them, in combination with means for controlling the number of each character cast and deposited in its receptacle.

29. In a device of the kind described, the combination of a plurality of concentrically mounted matrices, a mold adapted to coöperate with any of said matrices for forming the various individual type characters used in the art of printing, means for selecting each matrix as required and positioning the same to form a part of said mold, means for operating said selecting means, a plurality of type receptacles and means for casting type and depositing the same in said receptacles.

30. In a device of the kind described and in combination, means for casting a series of type a receptacle for each character of type means for transferring said series of type to their proper receptacles, and means for automatically determining the number of type so cast and transferred.

31. In a device of the kind described, the combination of a mold, a plurality of movable matrices each adapted to close one end of said mold to form a mold cell for casting type, and means automatically governed by the number of characters used for selectively presenting the several matrices to said mold.

32. In a device of the kind described, the combination of means for casting the various characters used in the art of printing, means for automatically controlling the number of characters cast governed by the number of the various characters used, a separate receptacle for each form of character cast, and means within the various receptacles for automatically controlling the casting means.

33. In a device of the kind described, a mold, a plurality of movable matrices adapted to close the mold and means for moving the same, in combination with a selector for positioning a matrix to form a mold for the casting of one of the characters used in printing, and means controlled by the supply of type in the magazine for that character for automatically operating the casting and selecting means.

34. In a device of the kind described, the combination of type casting mechanism provided with a mold and a plurality of matrices each of which is adapted to close the mold, a receptacle for each character cast, means for selecting and positioning the particular matrix from which the character is to be cast, controlled by means within said receptacle governed by the quantity of type therein and means for transferring the cast type from the mold to their respective receptacles.

35. A device of the kind described, comprising means for casting a predetermined number of any one of the characters used in printing, a receptacle for said type, and means for transferring the entire number of type to and depositing the same in the receptacle, in combination with means arranged within said receptacle for automatically controlling the casting of the character contained therein.

36. In a device of the kind described, the combination of type casting mechanism provided with a mold and a plurality of matrices each adapted to close the mold, a plurality of receptacles for the cast type, and means for maintaining a substantially uniform supply of type in said receptacles, comprising automatic mechanism arranged to select and present to the mold the proper matrix of the character the supply of which has been reduced to a certain limit, and at the same time start the casting mechanism.

37. In a device of the kind described, the combination of a rotatable matrix carrier, means for rotating said carrier until the matrix necessary to produce the character desired is opposite the mold cell, and means for casting a plural series of individual type from said matrix.

38. In a device of the kind described, a plurality of matrices arranged upon the periphery of a wheel, means for rotating the same, a cylinder having pockets or depressions in its surface mounted concentrically with said wheel and arranged to rotate therewith, and an adjustable mold adapted to coöperate with any of said matrices to form a mold cell for producing a printer's type of the usual form, in combination with a plurality of receptacles each adapted to contain a plurality of type cast from a single matrix, and provided with a follower to rest upon the type therein, each follower being provided with engaging mechanism adapted to be operated by the downward movement of the follower past a certain point to cause said engaging mechanism to engage one of the pockets of said cylinder to stop the rotation of said matrix wheel with the matrix for producing the form of type contained in said receptacle in position to coöperate with said mold for casting type, and means for casting a predetermined number of type from said matrix while so positioned.

39. In a device of the kind described, a plurality of matrices arranged upon the periphery of a wheel, means for rotating the same, a cylinder having pockets or depressions in its surface mounted concentrically with said wheel and arranged to rotate therewith, and an adjustable mold adapted to coöperate with any of said matrices to form a mold cell for producing a printer's type of the usual form, in combination with a plurality of receptacles each adapted to contain a plurality of type cast from a single matrix, and provided with a follower to rest upon the type therein, each follower being provided with engaging mechanism adapted to be operated by the downward movement of the follower past a certain point to cause said engaging mechanism to engage one of the pockets of said cylinder to stop the rotation of said matrix wheel with the matrix for producing the form of type contained in said receptacle in position to coöperate with said mold for casting type, means for casting a predetermined number of type from said matrix while so positioned, and means for transferring said type to, and depositing the same in, said receptacles.

40. In a device of the kind described, a rotatable disk or wheel, a plurality of matrices arranged at the periphery thereof, means for rotating said wheel, a mold for forming type, and a plurality of type containing channels, in combination with selective mechanism controlled by the number of type in one of said channels, for presenting one of said matrices in coöperative position with said mold, and means for casting and depositing in said channel a predetermined number of identically formed type.

41. In a type casting and distributing machine, an adjustable mold, a plurality of movable matrices and a series of type containing channels, in combination with selecting mechanism adapted to control the position of said matrices by the number of type contained in the respective type containing channels, and means for automatically starting and stopping the casting mechanism.

42. A device of the kind described, comprising means for casting type, and a plurality of receptacles for said type, said casting means operating to successively cast a plurality of identical type at each operation, in combination with means for automatically controlling the operation of said casting means by the number of type extracted from the receptacle, and intermediate mechanism for transferring the type cast to their respective receptacles.

43. In a device of the kind described, means for casting type, and a plurality of receptacles for said type, said casting means selectively operating to successively cast a plurality of identical type at each operation, in combination with means for automatically controlling the operation of said casting means by the number of type extracted from said receptacles.

44. In a device of the kind described, means for casting type, a plurality of receptacles for said type, and mechanism governed by the quantity of type in said receptacles, for controlling said type casting mechanism.

45. In a device of the kind described, type casting mechanism, and a coöperating matrix wheel, in combination with means for automatically controlling the rotations of said wheel and the operation of said casting mechanism, arranged to simultaneously start the rotations of said wheel and stop the operation of said mechanism or stop the rotations of said wheel and start the operation of said mechanism.

In testimony whereof, I have hereunto signed my name in the presence of two subscribing witnesses.

JOHN S. THOMPSON.

Witnesses:
  CHARLES I. COBB,
  BURTON U. HILLS.